(12) United States Patent
Williams et al.

(10) Patent No.: US 9,243,965 B2
(45) Date of Patent: Jan. 26, 2016

(54) SYSTEM AND METHOD FOR CALCULATING WINCH LINE PULL

(75) Inventors: Kirk Williams, Broken Arrow, OK (US); Darren Scott Barnes, Broken Arrow, OK (US); David M. Berezowski, Tulsa, OK (US)

(73) Assignee: Tulsa Winch, Inc., Jenks, OK (US)

( * ) Notice: Subject to any disclaimer, the term of this patent is extended or adjusted under 35 U.S.C. 154(b) by 916 days.

(21) Appl. No.: 13/291,637

(22) Filed: Nov. 8, 2011

(65) Prior Publication Data

US 2012/0290226 A1 Nov. 15, 2012

Related U.S. Application Data

(60) Provisional application No. 61/411,313, filed on Nov. 8, 2010.

(51) Int. Cl.
*G01L 1/00* (2006.01)
*G01L 5/10* (2006.01)
*G01L 5/00* (2006.01)
*G01L 3/00* (2006.01)

(52) U.S. Cl.
CPC .............. *G01L 5/103* (2013.01); *G01L 5/108* (2013.01); *G01L 3/00* (2013.01); *G01L 5/00* (2013.01)

(58) Field of Classification Search
USPC ...................... 73/862.041, 862.194
See application file for complete search history.

(56) References Cited

U.S. PATENT DOCUMENTS

| | | | | |
|---|---|---|---|---|
| 3,804,371 A | * | 4/1974 | Mills et al. | 254/336 |
| 4,501,335 A | * | 2/1985 | Gann | 173/178 |
| 5,190,250 A | * | 3/1993 | DeLong et al. | 244/137.1 |
| 5,209,414 A | * | 5/1993 | Clemens et al. | 242/484.1 |
| 5,456,268 A | * | 10/1995 | Bonutti | 128/898 |
| 6,668,668 B1 | * | 12/2003 | Peshkin | 73/862.56 |
| 7,489,098 B2 | | 2/2009 | Harris et al. | |
| 7,671,547 B2 | | 3/2010 | Addleman | |
| 2007/0089925 A1 | * | 4/2007 | Addleman | 180/313 |
| 2008/0038106 A1 | | 2/2008 | Spain | |
| 2010/0201970 A1 | * | 8/2010 | Pellen | 356/138 |
| 2010/0236107 A1 | * | 9/2010 | Kanzler et al. | 37/219 |
| 2010/0318294 A1 | * | 12/2010 | Rosing et al. | 701/220 |

* cited by examiner

*Primary Examiner* — Paul D Lee
(74) *Attorney, Agent, or Firm* — David G. Woodral; Fellers, Snider, Blankenship Bailey & Tippens, P.C.

(57) ABSTRACT

A device having a winch spool, a torque sensor that measures torque of the winch spool, a first angle sensor that detects a first angle of a winch line relative to a central axis of the winch spool, and a second angle sensor that detects a second angle of the winch line coming from a coil of line on the spool relative to a surface of the coil of line is disclosed.

16 Claims, 6 Drawing Sheets

SYSTEM AND METHOD FOR CALCULATING WINCH LINE PULL

CROSS REFERENCE TO RELATED APPLICATIONS

This application claims the priority of U.S. Provisional Patent Application No. 61/411,313 entitled "SYSTEM AND METHOD FOR CALCULATING WINCH LINE PULL," filed Nov. 8, 2010, the contents of which are hereby incorporated by reference.

FIELD OF THE INVENTION

This disclosure is directed to winch systems or similar devices in general and, more particularly, to a system for measuring line pull on a winch or similar device.

BACKGROUND OF THE INVENTION

It is often helpful to know how much a winch or similar device is lifting or pulling. To find this, theoretically, the torque applied by the winch is divided by the distance between the center axis of the winch or similar device and the location where the rope exits the winch or similar device. The equation for this is F=T/X, where F is the weight of the load (or line pull), T the output torque and X is the distance from the center axis of the winch or similar device perpendicular to the point where the rope exits the winch or similar device. In actuality, this calculation is more complicated. The rope rarely winds perfectly onto the drum. Much of the time the line is allowed to wind onto the drum or similar device in a random fashion, creating peaks and valleys for the line to rise and fall into as it changes layers. This means that the X mentioned above is constantly changing.

SUMMARY OF THE INVENTION

The invention of the present disclosure, in one aspect thereof, comprises a device having a winch spool, a torque sensor that measures torque of the winch spool, a first angle sensor that detects a first angle of a winch line relative to a central axis of the winch spool, and a second angle sensor that detects a second angle of the winch line coming from a coil of line on the spool relative to a surface of the coil of line In some embodiments means for determining a distance from the surface of the coil of line to the central axis of the winch spool utilizing the measured first and second angles is provided. Means for determining an amount of force applied to the winch line based upon torque detected by the sensor and the measured first and second angles may also be provided. This means may determine a distance from the central axis of the winch spool to a point where the winch line leaves the coil based upon the measured first and second angles, and divides the torque by the distance to calculate the force. Such means for determining can comprise a solid state computer. A data bus may provide the measured first and second angle, and torque, to the solid state computer.

Some embodiments will provide a bracket for affixing the first and second angle sensors in relation to the winch spool such that the first sensor detects the first angle and the second sensor detects the second angle. The bracket may comprise a swing arm hinged on a first end to a point in a stable relationship with respect to the winch spool and having a second end with a winch line guide that keeps the second end of the swing arm in alignment with the winch line coming off the spool. In other embodiments, the bracket comprises a line guide that slides along a path equidistant from the winch spool and remains in alignment with the winch line coming off the spool.

The invention of the present disclosure, in another aspect thereof, comprises a method of determining line pull on a winch or similar device. The method includes measuring a first angle of a winch line relative to a central axis of a winch drum, measuring a second angle of the winch line relative to a spool of winch line on the drum, measuring a torque applied to the winch drum, and determining a force on the winch line based upon the measured first and second angle and the measured torque.

The method may also include providing first and second sensors proximate the winch line to determine first and second angles, respectively. Mounting the first and second sensors on an arm with one end fixed in relation to the winch spool may also be performed. In other embodiments, mounting the first and second sensors on a bracket moveable within a raceway at least partially surrounding the winch spool is included.

Another factor that makes it complicated is the angle at which the rope exits the winch or similar device. This angle can change according to where the load is located in relation to the winch or similar device. As the exit angle of the line changes, the place where the rope exits the winch or similar device moves relative to the center axis, causing X to change.

What is needed is a system and method for addressing the above and related concerns.

BRIEF DESCRIPTION OF THE DRAWINGS

The accompanying drawings are to be read in conjunction with the reference numerals, which indicate like parts in the various views.

DETAILED DESCRIPTION OF THE PREFERRED EMBODIMENTS

Figure 1:
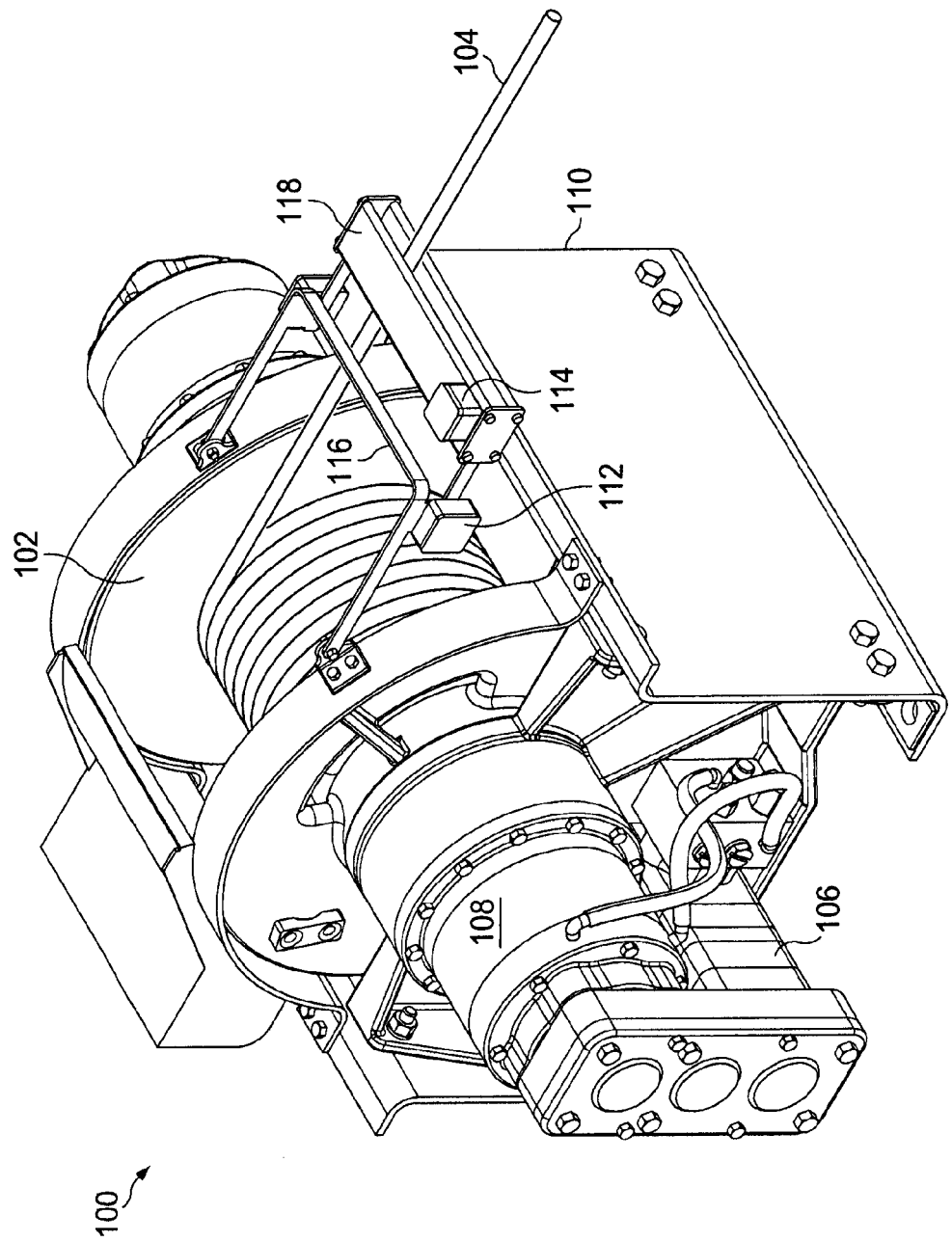
FIG. 1 is a perspective view of one embodiment of a winch system according to aspects of the present disclosure.

Referring now to FIG. 1, a perspective view of a winch system 100 according to aspects of the present disclosure is shown. The winch 100 includes a winch drum 102 that may be provided with winch line 104. The winch line 104 could be rope, cable, or another suitable material depending upon the application of the winch 100. The cable 104 will be wrapped around and spool from the drum 102. A winch motor 106 will provide the turning and/or braking force for the winch drum 102 that will allow loads to be manipulated via the winch line 104. The motor 106 may be electric, hydraulic, or based upon other technology. In the present embodiment, the winch 100 is also provided with a torque sensor 108. The torque sensor 108 serves to determine an amount of torque being applied to the drum 102 by tension on the winch line 104. The torque sensor 108 may be based on a strain gauge, magnetics, slip rings, surface acoustic waves or other technologies. The torque sensor provides an electronic signal indicative of torque value at the drum.

It is understood that the components associated with the winch 100 may be mounted on or around support structures such as bracket 110. This may allow the winch 100 to be mounted to a vehicle or a stationary location for use in lifting or manipulating loads. Attached to part of the support structure 110 associated with the winch 100 is a swing arm 116. In the present embodiment, the swing arm 116 is attached to the support structure 110 only on a single end thereof. The opposite end provides a location for mounting a first angle sensor 112 and a second angle sensor 114. The angle sensors 112, 114 may be solid state electronic sensors. The sensors 112, 114 provide an electronic signal that is indicative of the angle at which the sensor lies relative to a baseline (e.g., the sensor may provide the angle relative to horizontal). In the present embodiment, and as explained more fully below, the first angle sensor 112 is located and configured to measure the angle of the winch line 104 relative to the center of the drum 102. The second angle sensor 114 is located and configured to measure the angle of the winch line 104 relative to the location where the line pulls away from, or exits from, the drum 102.

Also mounted to the swing arm 116 is a line guide 118. In the present embodiment, the second sensor 114 is actually mounted to the line guide 118. The line guide 118 also serves to ensure that the angle sensors 112, 114 remain aligned with the winch line 104 as it exits the spool or drum 102. As will be described in greater detail below, measurements taken by the angle sensor 112, 114 combined with measurements provided by the torque sensor 108 can be utilized to determine an amount of tensile force applied to the winch line 104.

Figure 2:
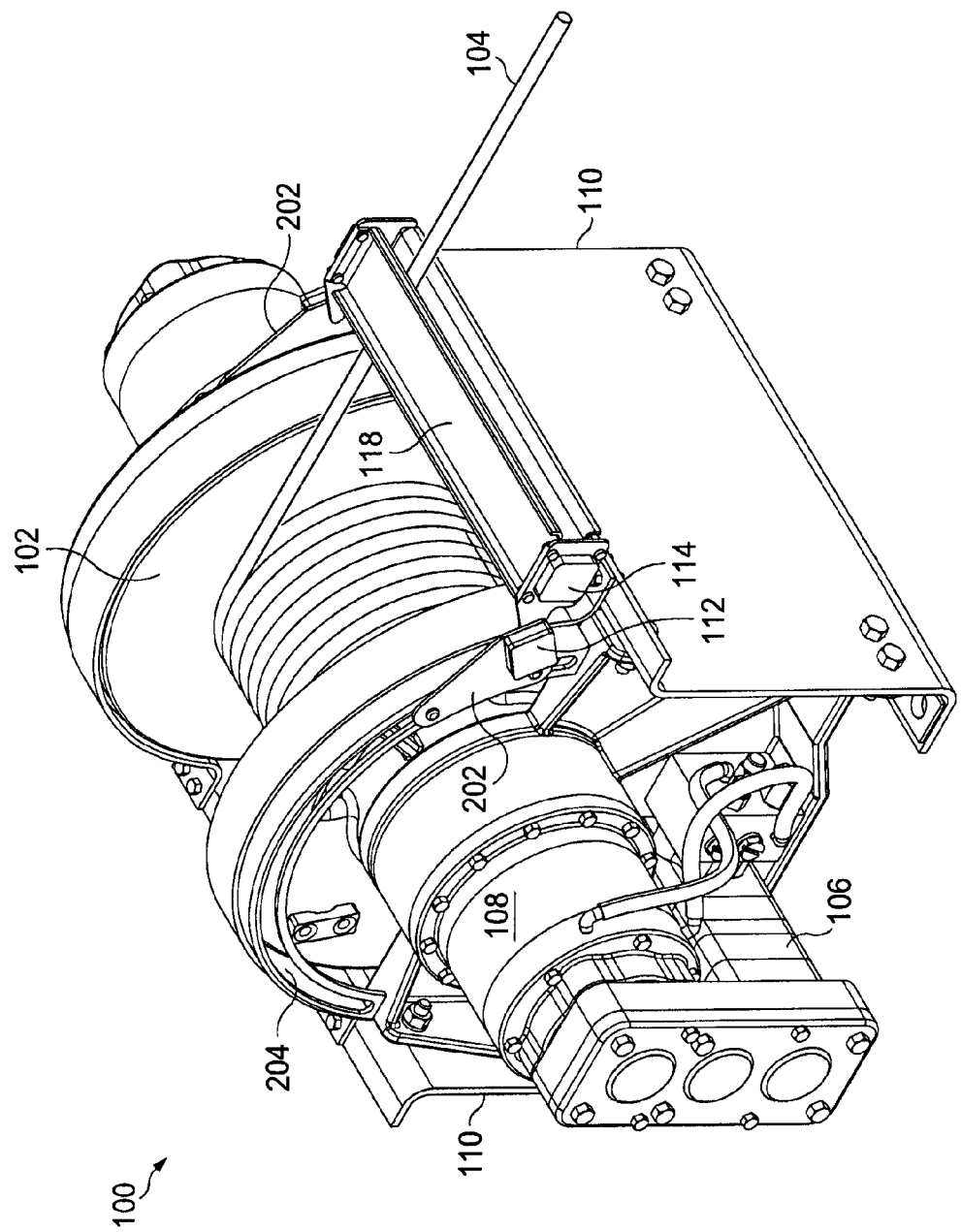
FIG. 2 is a perspective view of another embodiment of a winch system according to aspects of the present disclosure.

Referring now to FIG. 2, a perspective view of another embodiment of a winch system 100 is shown. It will be appreciated that many of the components of FIG. 2 are shared with FIG. 1. For example, the system includes a drum 102 containing a supply of winch line 104. A motor 106 provides turning and braking force to the drum 102. The entire system may be mounted or affixed to various support brackets 110.

As before, a first angle sensor 112 is provided in conjunction with a second angle sensor 114. However, rather than being mounted by a swing arm, the sensors are attached to the winch 100 via brackets 202. The brackets 202 also attach to the line guide 118. The brackets 202 in the present embodiment are free to rotate or slide within a raceway 204. The raceway in the present embodiment is defined on the support structure 110 of the winch 100 to allow the line guide 118 and sensors 112, 114 to rotate in a fixed relationship with respect to the drum 102. The sensors 112, 114 will remain equidistant from the center of the drum 102 while being allowed to rotate about the center as the angle of the line 114 coming off the drum 102 changes.

Figure 3:
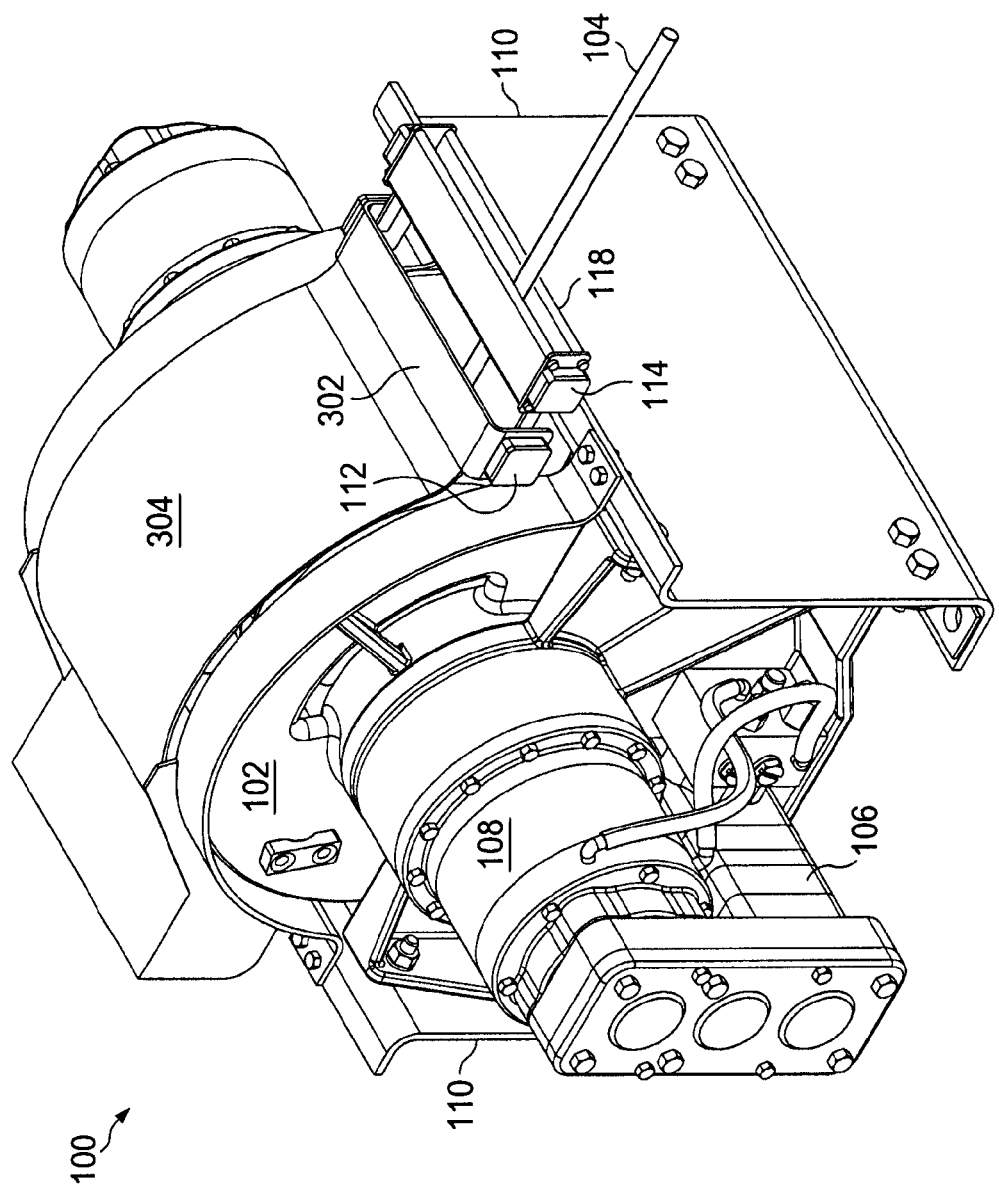
FIG. 3 is a perspective view of another embodiment of a winch system according to aspects of the present disclosure.

Referring now to FIG. 3, yet another perspective view of a winch 100 according to aspects of the present disclosure is shown. The embodiment of FIG. 3 is similar to the previous embodiments in that the major components of the winch itself, namely the drum 102, winch line 104, and motor 106, are provided in substantially the same relationship. In the present embodiment, the sensors 112, 114 are also mounted so as to remain substantially in line with the winch line 104 as it exits the drum 102. In the present embodiment, a cover 304 is provided to cover the drum 102. In some embodiments, the cover may retract freely as the angle of the winch line 104 changes. A bracket 302 may be provided as part of the cover 304 for mounting of the first angle sensor 112. The cover 304 may also provide a mounting location for the line guide 118. The line guide 118 may now be second angle sensor 114.

Figure 4:
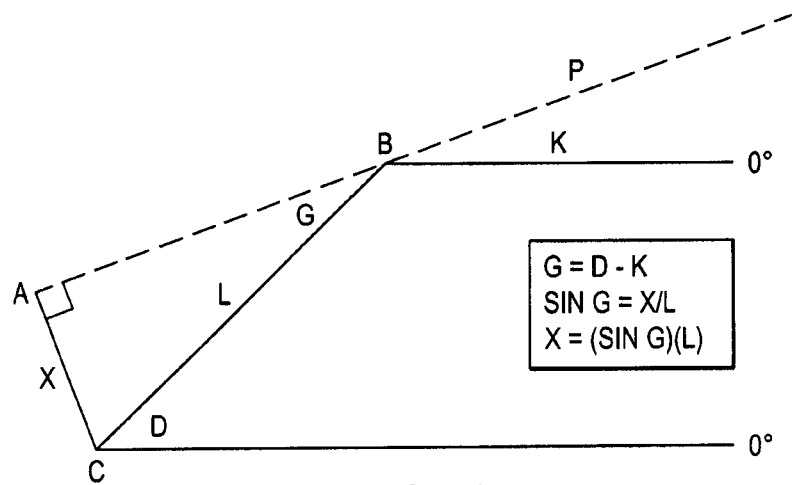
FIG. 4 is a diagram of the geometric relationship between various components of the winch systems of FIGS. 1-3.

Referring now to FIG. 4, a diagram of the various angles involved in the deployment of the winch line 104 from the drum is shown. For purposes of the present discussion, the location labeled "P" is the location of the second angle sensor 114. This sensor measures the angle denoted "K", which is the angle of the winch line relative to the location on the winch drum or spool where the line pulls away. Since the sensor P is located on the line guide 118 and is always substantially in line with the winch line 104, it can be configured to consistently provide a measurement of the angle of the winch line 104 as it exits the drum 102. Sensor 112, located at location B, can be configured to indicate the angle of the winch line 104 relative to the center of the drum 102, denoted "C". This is denoted as angle "D". Location "B", or first sensor 112, will remain at a constant distance "L" from the center C of the drum 102. As the winch line 104 is wound and unwound from the drum 102, the distance "X" from center C to exit point A will vary. It is the distance X which can be calculated using the system described in the present disclosure.

Figure 5A:
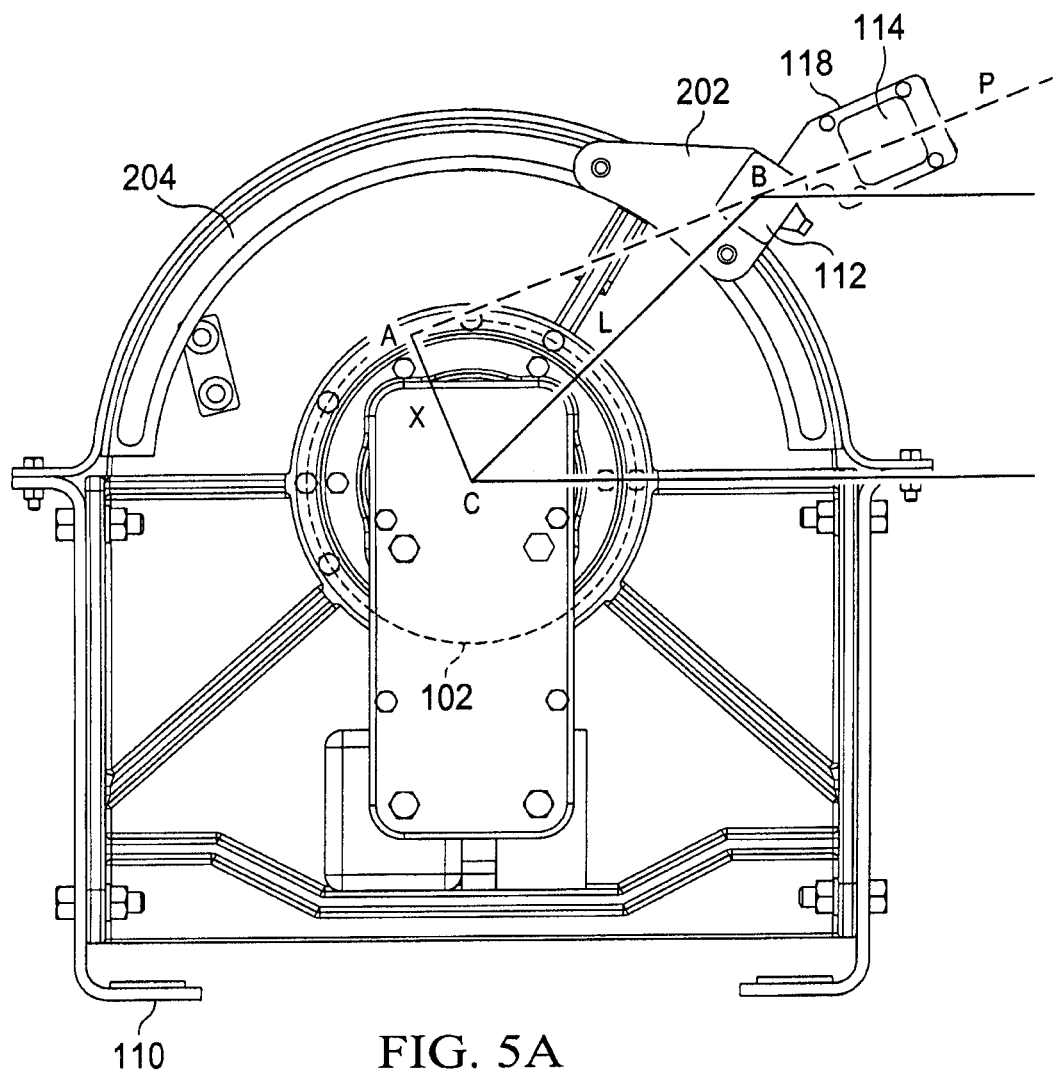
FIG. 5A side view of a winch system according to aspects of the present disclosure with an overlay showing the geometric relation between various components.

Referring now to FIG. 5A a side view of a winch system according to aspects of the present disclosure is shown with an overlay of the geometric relation between various components. FIG. 5 illustrates the angles and relationships described with respect to FIG. 4 as applied to a winch system as previously described. It can be seen that C is at the center of the winch drum 102. The first sensor 112 lies a constant distance L from the center C at location B. The second sensor 114 is at location P on the line guide 118.

The first sensor 112 measures the angle of the winch line at point B, relative to the center of the drum C. Sensor 112 provides the angle as displacement from the horizontal (e.g., horizontal being zero). The second sensor 114 measures the angle of the winch line from the location A (where it leaves the drum) also relative to the horizontal.

Figure 5B:
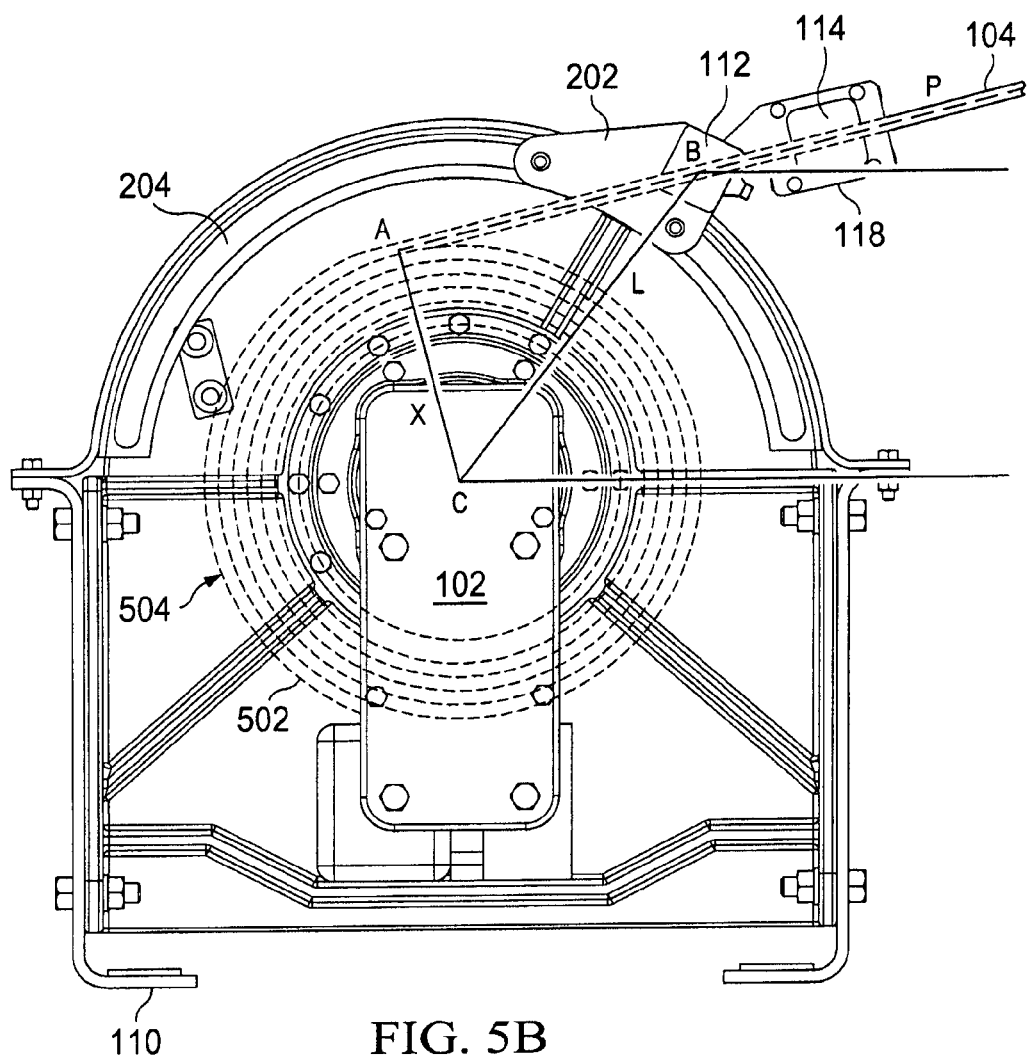
FIG. 5B is another side view of a winch system according to aspects of the present disclosure with an overlay showing the geometric relation between various components when a quantity of winch line is present on the spool.

It will be appreciated that the distance X, the distance from A to the center of the drum 102 will vary depending upon the amount of winch line spooled onto the drum 102. FIG. 5B illustrates the geometric relation between various components when a quantity of winch line is present on the drum 102. Here a spool of line 502 is wrapped around the drum 102. This has altered the distance X from the center C of the drum 102 to the location A where the line 104 exits the spool 502. In other words, X is the distance from the center of the drum 102 to a working surface 504 of the spool 502.

Using the measured angles K and D, angle G (FIG. 4) can be determined: G=D−K. The sine of angle G is equal to the distance X divided by the distance L. In other words sin(G) =X/L. Rearranging this equation yields X=(sin(G))/L. G is computed as described. The distance L remains constant since it is the distance from sensor 112 to the very center C of the drum 102. Therefore using the measured angles K and D, the distance X can be determined. Torque on the winch drum 102 is the force applied to the winch line 102 multiplied by the distance X. X is now known and the torque is measured. Hence the winch line pull can be computed: F=torque/X.

Figure 6:
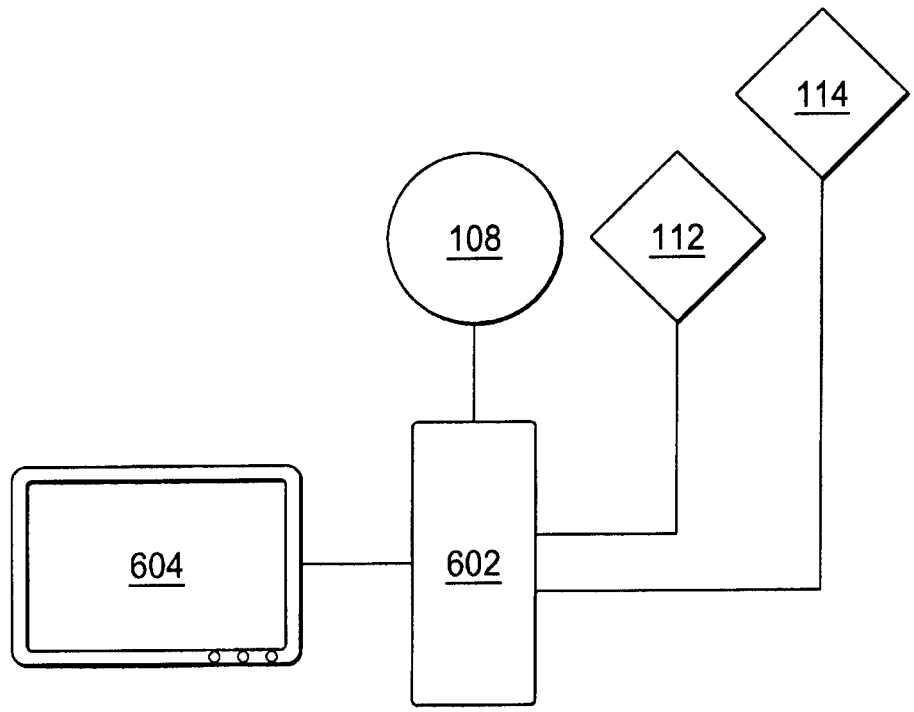
FIG. 6 is a block diagram of a line pull calculation system according to aspects of the present disclosure.

Referring now to FIG. 6 is a block diagram of a line pull calculation system according to aspects of the present disclosure is shown. Here a computer 602 receives the input from torque sensor 108, and angle sensors 112, 114. As described the computer 602 calculates the line pull. This may be displayed on display unit 604. Various methods of communicating the torque and angles to the computer 602 may be implemented. The signals may be analog or digital and may be provided individually or on a common bus. In some embodiments, the signals are communicated wirelessly to the computer 602. The computer 602 may be a solid state computer or a device using a combination of solid state circuitry and electro-mechanical devices. The computer may be specific to the system described herein or it may be part of a large control computer on a vehicle or within a plant or similar. The display unit 604 may be segment based on part of a graphical display system. It may be dedicated to the winch system 100 or it may be part of a larger display system.

Thus, the present invention is well adapted to carry out the objectives and attain the ends and advantages mentioned above as well as those inherent therein. While presently preferred embodiments have been described for purposes of this disclosure, numerous changes and modifications will be apparent to those of ordinary skill in the art. Such changes and modifications are encompassed within the spirit of this invention as defined by the claims.

We claim:

1. A device comprising:
   a winch spool;
   a torque sensor that measures torque of the winch spool;
   a first angle sensor that detects a first angle between a line defined as passing from a location of the first angle sensor following a winch line coming from the winch spool and passing to a central rotational axis of the winch spool and a first horizontal line perpendicular to and originating from the central rotational axis; and
   a second angle sensor following the winch line coming from the winch spool that detects a second angle between the winch line coming from the winch spool and a second horizontal line originating at the first angle sensor and parallel to the first horizontal line.

2. The device of claim 1, further comprising means for determining a distance from a surface of a coil of line to the central rotational axis of the winch spool utilizing the measured first and second angles.

3. The device of claim 1, further comprising means for determining an amount of force applied to the winch line based upon torque detected by the sensor and the measured first and second angles.

4. The device of claim 3, wherein the means for determining determines a distance from the central axis of the winch spool to a point where the winch line leaves a coil based upon the measured first and second angles, and divides the torque by the distance to calculate the force.

5. The device of claim 4, wherein the means for determining is a solid state computer.

6. The device of claim 5, further comprising a data bus for providing the measured first and second angle, and torque, to the solid state computer.

7. The device of claim 1, further comprising a bracket for affixing the first and second angle sensors in relation to the winch spool such that the first sensor detects the first angle and the second sensor detects the second angle.

8. The device of claim 7, wherein the bracket comprises swing arm hinged on a first end to a point in a stable relationship with respect to the winch spool and having a second end with a winch line guide that keeps the second end of the swing arm in alignment with the winch line coming directly off the spool.

9. The device of claim 7, wherein the bracket comprises a line guide that slides along a path equidistant from the winch spool and remains in alignment with the winch line coming off the spool.

10. A device comprising,
    a first angle sensor aligned with a winch line coming from a winch spool and reporting a first angle between a line passing from the first angle sensor to a central rotational axis of the winch spool and a first horizontal line perpendicular to and originating from the central rotational axis; and
    a second angle sensor aligned with the winch line coming from the winch spool and reporting a second angle between the winch line at the second angle sensor and a second horizontal line originating at the first angle sensor and parallel to the first horizontal line.

11. The device of claim 10, further comprising a torque sensor attached to the winch spool and configured to measure the amount of torque applied to the spool via the winch line.

12. The device of claim 11, further comprising a computing device configured to determine the amount of force applied to the winch line using the first and second angles and the torque.

13. The device of claim 12, wherein the computing device determines the amount of force applied to the winch line using the formula $F=t/x$, where:
    $t$=measured torque;
    $x=\sin\theta*L$;
    $\theta$=angle measured from the first sensor minus the angle measured from the second sensor; and
    $L$=a distance from the first sensor to the center of the winch spool.

14. The device of claim 10, further comprising a swing arm mounted via a hinge to a fixed location relative to the winch spool and having the first and second sensors thereon.

15. The device of claim 10, further comprising a bracket with the first and second sensors attached thereto, the bracket mounted in a raceway surrounding at least a portion of the winch spool.

16. The device of claim 10 further comprising a line guide having the first and second sensors attached thereto and configured to remain in line with the winch line.

* * * * *